United States Patent
Brown et al.

(10) Patent No.: US 10,684,364 B2
(45) Date of Patent: Jun. 16, 2020

(54) METHOD FOR OPERATING A RADAR DEVICE

(71) Applicant: Robert Bosch GmbH, Stuttgart (DE)

(72) Inventors: Christopher Brown, Seligenstadt (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 191 days.

(21) Appl. No.: 15/738,502

(22) PCT Filed: Apr. 29, 2016

(86) PCT No.: PCT/EP2016/059608
§ 371 (c)(1),
(2) Date: Dec. 20, 2017

(87) PCT Pub. No.: WO2016/206841
PCT Pub. Date: Dec. 29, 2016

(65) Prior Publication Data
US 2018/0164421 A1 Jun. 14, 2018

(30) Foreign Application Priority Data
Jun. 22, 2015 (DE) .................. 10 2015 211 490

(51) Int. Cl.
*G01S 13/58* (2006.01)
*G01S 7/35* (2006.01)
(Continued)

(52) U.S. Cl.
CPC ............ *G01S 13/584* (2013.01); *G01S 7/354* (2013.01); *G01S 13/343* (2013.01); *G01S 13/931* (2013.01); *G01S 2007/356* (2013.01)

(58) Field of Classification Search
CPC .... G01S 13/343; G01S 13/584; G01S 13/726; G01S 13/931; G01S 7/354;
(Continued)

(56) References Cited

U.S. PATENT DOCUMENTS

| 7,639,171 B2 * | 12/2009 | Alland | .................... H01Q 1/28 342/25 R |
| 2015/0153444 A1 * | 6/2015 | Nichols | ................... G01S 13/89 342/385 |

OTHER PUBLICATIONS

N. K. Bose, Multidimensional Systems and Signal Processing: Good Theory for Good Practice, IEEE 2007.*
(Continued)

*Primary Examiner* — Peter M Bythrow
*Assistant Examiner* — Michael W Justice
(74) *Attorney, Agent, or Firm* — Norton Rose Fulbright US LLP; Gerard Messina

(57) ABSTRACT

A method for operating a radar device, including ascertaining a matrix with time signals of reflected radar radiation, ascertaining elements of a distance-velocity-power matrix of a radar target from the time signals, carrying out a first discrete one-dimensional Fourier transform for the elements of the distance-velocity-power matrix in a first dimension, and carrying out a second discrete one-dimensional Fourier transform for the elements of the distance-velocity-power matrix in a second dimension in such a way that the second discrete one-dimensional Fourier transform is carried out for each second element of the distance-velocity-power matrix in a mathematically defined offset manner.

6 Claims, 4 Drawing Sheets

(51) Int. Cl.
*G01S 13/34* (2006.01)
*G01S 13/931* (2020.01)

(58) Field of Classification Search
CPC ....... G01S 2007/356; G01S 2013/9375; G01S 13/18; G01S 13/53; G01S 13/532; G01S 13/64
USPC .......................................................... 342/70
See application file for complete search history.

(56) References Cited

OTHER PUBLICATIONS

N. K. Bose, Multidimensional Systems and Signal Processing: Good Theory for Good Practice, IEEE 2007 (Year: 2007).*
International Search Report dated Jun. 29, 2016, of the corresponding International Application PCT/EP2016/059608 filed Apr. 29, 2016.
Bose, N.K.: "Multidimensional Systems and Signal Processing: Good Theory for Good Practice", IEEE Circuits and Systems Magazine, 4th Quarter 2007, pp. 20-41.

* cited by examiner

METHOD FOR OPERATING A RADAR DEVICE

FIELD

The present invention relates to a method for operating a radar device. In addition, the present invention relates to a radar device.

BACKGROUND INFORMATION

Radar systems are finding increased use in the motor vehicle sector for the purpose of rendering assistance to advanced driver assistance systems of the motor vehicles. One of the main tasks of said radar systems consists of ascertaining a distance from objects as well as a velocity of the objects (e.g., vehicles, pedestrians, stationary obstacles, etc.) in the vicinity of the motor vehicle. This is important for the adaptive cruise control (ACC) driver assistance system, for example, where a precise estimate of a distance and a relative velocity of the vehicle are used for ascertaining appropriate actions of the motor vehicle.

In motor vehicles, said radar systems may also be used for the realization of safety functions, such as warning the driver in critical situations and initiating a full application of the brakes if a collision can no longer be avoided.

There are a variety of different signal modulation methods. The chirp sequence modulation (CS modulation) represents a modulation type that is especially frequently used in automotive radar systems. In this type of modulation, a sequence of what is known as chirp signals (linear frequency-modulated, electromagnetic signals) is emitted, for which the instantaneous frequency of the signals is linearly variable in time. One of the advantages of the chirp sequence modulation is that it allows for a simultaneous estimate of a distance and a relative velocity of objects.

After reflected chirp signals have been received and suitably preprocessed, the reflected time signals are typically stored in a two-dimensional matrix. Each column of the matrix includes values of received signals of a chirp, the number of columns of the matrix corresponding to the number of chirp signals of a transmission sequence.

A discrete Fourier transform (DFT) for data elements of a chirp along a column of the data matrix allows for an estimate of a distance (or a distance range) of targets in a coverage zone of the radar. The data elements of the columns of the matrix represent distances of target objects. A performance of a second discrete Fourier transform along the lines of the resulting matrix allows for an estimate of the relative velocity of the target objects.

Carrying out a two-dimensional discrete Fourier transform produces a distance-velocity-power matrix (d-v matrix); the amplitude values of the elements of the d-v matrix in a third dimension represent estimates of the reflected signal energy for the corresponding distance and the corresponding velocity of the target object. In practice, a fast Fourier transform is typically performed for this purpose, which realizes an efficient implementation of the discrete Fourier transform.

SUMMARY

It is an object of the present invention to provide an improved method for operating a radar device.

According to a first aspect, the object may be achieved by a method for operating a radar device, the method having the following steps:

Ascertaining a matrix with time signals of reflected radar radiation;

Ascertaining elements of a distance-velocity-power matrix of a radar target from the time signals;

Performing a first discrete one-dimensional Fourier transform for the elements of the distance-velocity-power matrix in a first dimension; and Performing a second discrete one-dimensional Fourier transform for the elements of the distance-velocity-power matrix in a second dimension, in such a way that the second discrete one-dimensional Fourier transform is performed for each second element of the distance-velocity-power matrix of the second dimension in a mathematically defined offset manner.

According to a second aspect, the object may be achieved by a radar device, which includes a generating device for generating elements of a distance-velocity-power matrix of a radar target; and an evaluation device for evaluating the elements of the distance-velocity-power matrix, elements of the distance-velocity-power matrix being uniformly evaluable in a first dimension with the aid of the evaluation device, and elements of the distance-velocity-power matrix being evaluable in a second dimension in a mathematically defined offset manner with the aid of the evaluation device.

In this way, performance-related peak values of elements of the distance-velocity-power matrix are able to be ascertained in a more optimal manner. In the final analysis, this is possible by realizing a type of hexagonal "scanning grating", whereby elements of the distance-velocity-power matrix advantageously only have to be compared to six other values for an evaluation. The "real" d-v space (distance-velocity space) is a continuous two-dimensional space, in which values at any given point of the d-v space correspond to an amplitude of a received radar signal that was generated by an object having a defined distance and a defined velocity relative to the radar. Since only a limited amount of input data is available, the "real" d-v space is therefore "scannable" only at certain points. In the final analysis, an increase in a "granularity" of the matrix is thus advantageously able to be provided, which advantageously aids in a better estimate of the distance and relative velocity of targets.

Preferred specific embodiments of the method according to the present invention are described herein.

According to one advantageous further development of the method, the elements of the distance-velocity-power matrix are generated with the aid of a chirp-sequence modulation. In this way, a modulation type is used that is advantageous in the automotive sector and that is particularly suitable for high real-time demands.

According to one advantageous further development of the present method, the discrete Fourier transform is first performed for all elements of columns of the distance-velocity-power matrix. Then, the discrete Fourier transform is performed for all elements of lines of the distance-velocity-power matrix. This makes it possible to carry out a column-wise generation of matrix elements. In an advantageous manner, data elements of the preceding chirp signal are already able to be processed with the aid of a discrete Fourier transform when subsequent chirp signals are received and when matrix elements following next are generated. This facilitates a high real-time capability of the present method.

According to another advantageous further development of the present method, the discrete Fourier transform is first carried out for all elements of lines of the distance-velocity-power matrix, and the discrete Fourier transform is subsequently performed for all elements of columns of the distance-velocity-power matrix. This allows for a reversal of the sequence of the performance of the discrete Fourier transform for the entire matrix, thereby making it possible to provide an equivalent effect in terms of mathematics, which may be suitable for less time-critical radar applications (e.g., in astronomy, geodesy, etc.), in particular.

Another advantageous further development of the method provides that each element of each second line of the distance-velocity-power matrix is multiplied by the factor $e^{-j\pi n/N}$, with the parameters:

n . . . column number of the distance-velocity-power matrix

N . . . total number of the columns of the distance-velocity-power matrix.

This provides a mathematically defined technical realization of the present method.

In the following text, the present invention will be described in detail together with further features and advantages with the aid of a plurality of figures. Here, all described or illustrated features, either on their own or in any combination, form the subject matter of the present invention, regardless of their combination in the description herein and in the figures.

DETAILED DESCRIPTION OF EXAMPLE EMBODIMENTS

Figure 1:
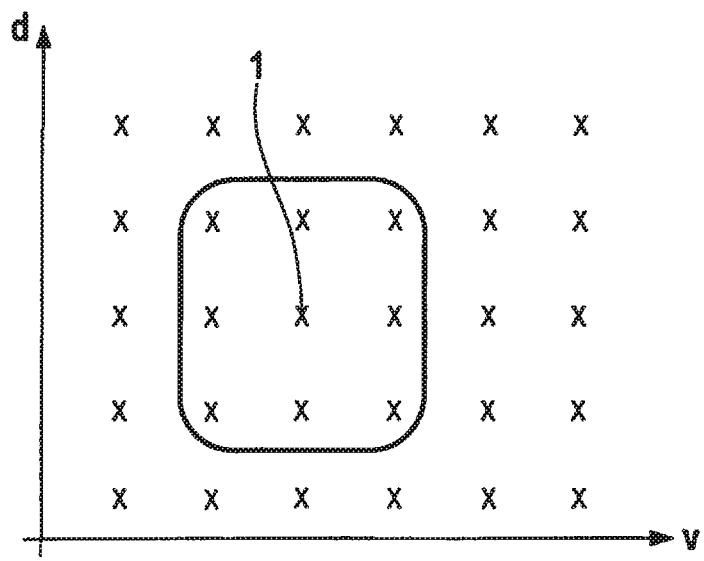
FIG. 1 shows a conventional scanning pattern for a d-v matrix having a cell under test.

FIG. 1 shows a basic representation of a conventional scanning pattern for a distance-velocity-power matrix (d-v matrix) in the d-v plane. The d-v plane scales a velocity v in the x-direction, and a distance d of a radar device of a motor vehicle to a target object (not shown) in the y-direction. A reliable ascertainment of the target object requires an ascertainment of peak values of elements of the distance-velocity-power matrix. Each peak value represents a potential target object, provided its power amplitude, which is plotted in a third dimension, lies above background noise. In the illustrated known scanning pattern, in which cells under test 1 or scanning points are arranged in the form of a rectangle, local peaks are able to be found by comparing each matrix element to eight adjacent matrix elements. Using a square border, FIG. 1 illustrates that a cell under test (CUT) is surrounded by eight potential neighboring elements or cells under test 1 in the d-v plane.

Due to effects of restricted window sizes, a d-v spectrum of a target object has a two-dimensional pattern, which may include a main lobe and a plurality of side lobes, in typical applications. This has the effect of spreading electromagnetic signal energy across a plurality of adjacent cells. If only the main lobe is considered, then the existing signal energy becomes greater the closer cell under test 1 lies to the peak value of the d-v spectrum.

Although the four closest neighboring cells under test 1 (in the "north", "south", "east" and "west") have a minimum distance from a specific cell under test 1, distances to neighboring cells under test that are situated diagonally (in the northeast, northwest, southeast and southwest) are considerably greater. This makes it clear that distances between scanning points of the distance-velocity-power matrix and cell under test 1 may differ considerably. This is an immanent property of rectangular scanning patterns and means that the cells that are farther away ("northeast", "northwest", "southeast" and "southwest") are more sensitive with respect to influences of other target objects.

Figure 2:
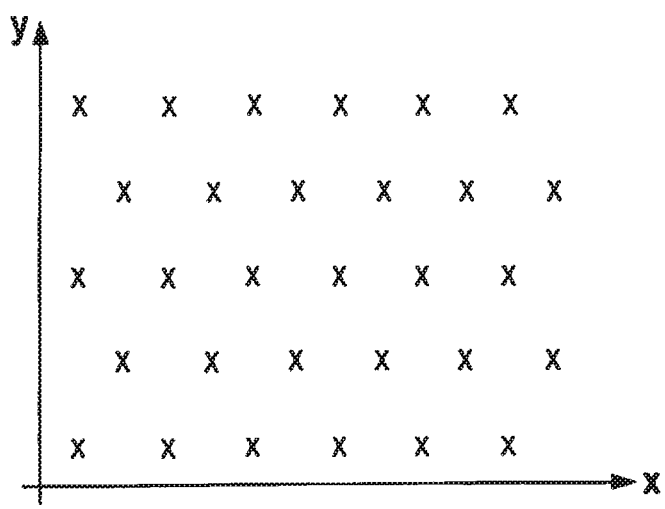
FIG. 2 shows a known placement pattern of telecommunications devices.

An alternative to rectangular scanning patterns is a hexagonal scanning pattern, in which each second line value or column value is shifted by a half value. The advantages of hexagonal scanning patterns with respect to locally scanned data are known in connection with geophysical applications, for example, in that an efficient coverage of an area is provided in this way. A maximum or worst-case distance between each point and a scanning point may therefore be reduced. Mobile radio masts or other devices of wireless telecommunication are consequently often placed according to a local hexagonal pattern, as can be gathered in principle from the diagram from FIG. 2 with the x- and y-axis.

In the mentioned geophysical applications, the two-dimensional region to be scanned is a physical region of a surface of the earth, in which both dimensions have the same physical unit of length.

It is proposed to subject a conventional two-dimensional matrix with chirp sequence data to a discrete, two-dimensional digital or discrete Fourier transform, for which the Fourier transform according to a hexagonal scanning scheme is used.

In the process, a two-dimensional d-v matrix, for example, is created to start with, in which each data element corresponds to a signal energy of a temporal chirp sequence signal. Using 32 chirp signals, for instance, a d-v matrix having 512 lines and 32 columns is thereby able to be produced for 512 signals in each case.

This is followed by a one-dimensional digital Fourier transform (preferably using a fast Fourier transform (FFT)) along each column of the d-v matrix.

As a next step, for each second line (e.g., each even-numbered line) of the d-v matrix, the one-dimensional digital Fourier transform is carried out for all elements of the entire line.

Finally, all elements of each second line (e.g., of each odd-numbered line) are multiplied by the factor $e^{-j\pi n/N}$, for which the following applies:

n . . . column number of the d-v matrix, 0 through N−1

N . . . number of the columns of the d-v matrix.

Next, the one-dimensional digital Fourier transform is carried out across the elements of each second line (e.g., each odd-numbered line) that are mathematically processed in this manner.

The effect of the last-mentioned step is to carry out the digital Fourier transform at so-called half-frequency bins or to evaluate the digital Fourier transform at frequencies between the usual standard frequency bins, rather than at k/N cycles per scanning step as in the conventional digital Fourier transform, the following applying:

k . . . whole number with values between 0 and N−1.

In the final analysis, the digital Fourier transform is thereby evaluated at lobes of (k+½)/N cycles per scanning.

As an alternative, the present method may also be realized by first completely carrying out the digital one-dimensional Fourier transform across all lines of the d-v matrix until all elements of the d-v matrix are transformed. Then, the multiplication of the elements of each second column by the factor e^−j*π*m/M is executed with the parameters:

m . . . line number
M . . . total number of lines

In this way it is possible to first process the lines and then to apply the shifted digital Fourier transform to alternative columns (equivalent to transposing the d-v data matrix).

A MATLAB code, by which the method is able to be realized, is listed in the following:

```
Function XX - fft2hex(x)
%x - time domain data matrix
%XX - calculated d-v matrix
X1 = fft(x,[ ],1);
N = size (x,2);
for ii=2:2:size(X1,1),
    X1(ii,:)=X1(ii,:).*exp(-1j*pi*(0:(N−1))/N);
end
XX=fft(X1,[ ],2);
end
```

Figure 3:
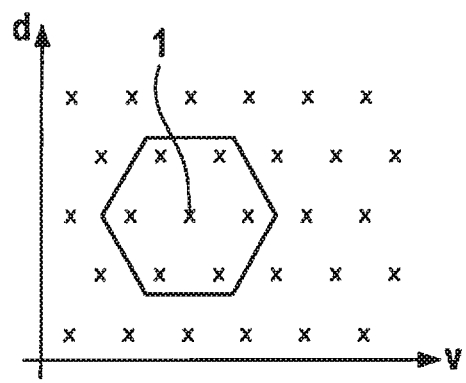
FIG. 3 shows a scanning pattern according to the present invention for a d-v matrix having a cell under test.

It can be gathered from FIG. 3 that as a result of such scanning, only six neighboring cells under test 1 now remain for a cell under test 1. FIG. 3 indicates this by a hexagonal border around cell under test 1.

In the following table 1 it is illustrated that the number of neighboring elements with respect to cell under test 1 has been reduced in the following way:

TABLE 1

| Number of Neighboring Elements | Velocity Domain | Distance Domain |
| --- | --- | --- |
| 2 | 1 | 0 |
| 4 | ½ | 1 |

In comparison, a conventional scanning pattern has the following distances of neighboring cells to cell under test 1, as illustrated in the following table 2:

TABLE 2

| Number of Neighboring Cells | Velocity Domain | Distance Domain |
| --- | --- | --- |
| 2 | 1 | 0 |
| 4 | 1 | 1 |
| 2 | 0 | 1 |

Figure 4:
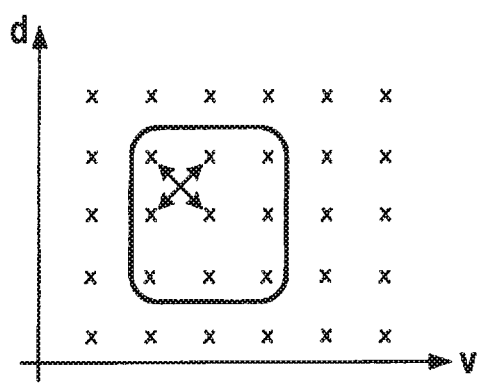
FIG. 4 shows a worst-case scenario of a conventional scanning pattern for a d-v matrix.
Figure 5:
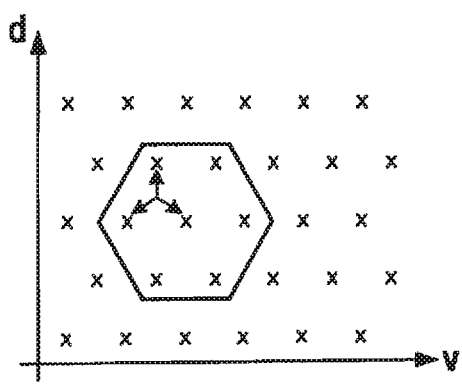
FIG. 5 shows a worst-case scenario of a scanning pattern according to the present invention for a d-v matrix.

FIG. 5 illustrates an advantage of such scanning of the distance-velocity-power matrix in comparison with FIG. 4.

Four arrows in FIG. 4 indicate that in a conventional rectangular scanning pattern a scanning point may have four adjacent, essentially equidistant scanning points in a worst-case scenario. This may make a reliable detection of a target object more difficult.

In contrast, it can be gathered from FIG. 5 featuring the modified scanning pattern, that in a worst-case scenario, a scanning point now has no more than three adjacent scanning points that have the same distance in each case, the distances to the adjacent scanning points being reduced in comparison with FIG. 4. A process for evaluating target objects may thus be considerably simplified and improved inasmuch as a distance of a peak in the d-v space to the most proximate scanning point is reduced. It can be gathered from FIG. 3 that only six comparisons with adjacent scanning points are required in this case rather than eight, as can be gathered from FIG. 1.

Figure 6:
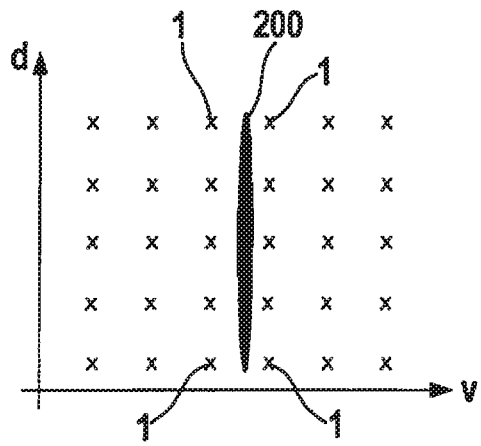
FIG. 6 shows a conventional scanning pattern for a d-v matrix having a target object with an elongated shape.

FIG. 6 shows a conventional, rectangular scanning pattern of a d-v matrix, where a target object 200 having an elongated shape is to be detected. It can be seen that because of the regular structure of the scanning pattern, a distance of target object 200 from all scanning points or cells under test 1 is developed to have an essentially identical size.

Figure 7:
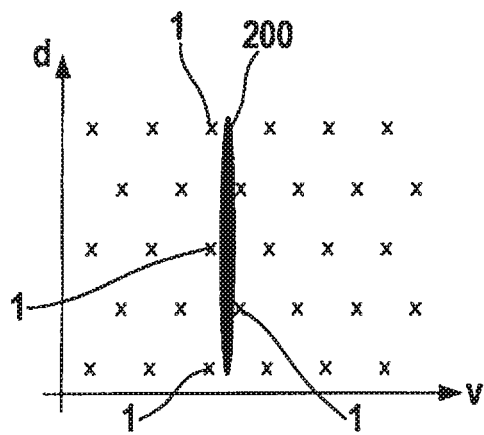
FIG. 7 shows a scanning pattern according to the present invention for a d-v matrix having a target object with an elongated shape.

FIG. 7, in contrast, illustrates that in a hexagonal scanning pattern, individual scanning points or cells under test 1 of the d-v matrix lie closer than others to target object 200. A detection of elongated target object 200 may therefore be easier and more precise, which may be useful especially when target object 200 is weak (such as a weakly reflecting pedestrian), since a contribution of the signal peak value of target object 200 to the amplitude of the most proximate d-v matrix element increases in strength the closer the scanning point lies to the peak value of target object 200. When using the scanning pattern from FIG. 7, a distance between a "genuine" target in the d-v space and the next scanning point is thus ultimately only approximately half as large than when using the conventional scanning pattern from FIG. 6.

Figure 8:
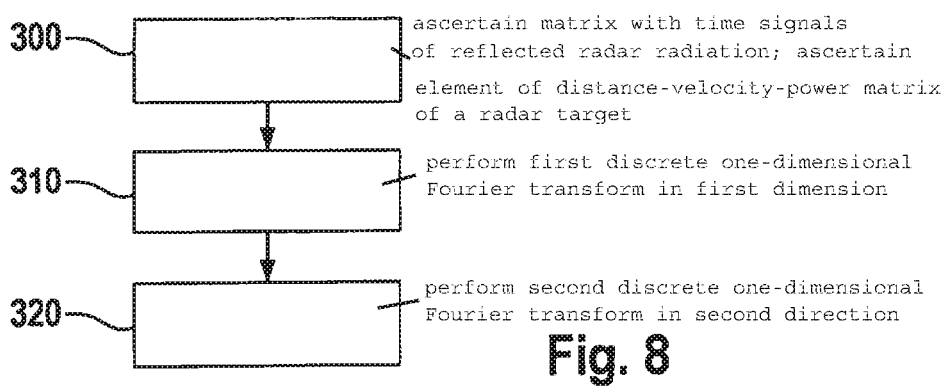
FIG. 8 shows a basic flow diagram of one specific embodiment of a method for operating a radar device.

FIG. 8 basically shows a sequence of one specific embodiment of the method according to the present invention.

In a step 300, an ascertainment of a matrix with time signals of reflected radar radiation and an ascertainment of elements of a distance-velocity-power matrix of a radar target take place.

In a step 310, a first discrete one-dimensional Fourier transform for the elements of the distance-velocity-power matrix is performed in a first dimension.

In a step 320, a second discrete one-dimensional Fourier transform is carried out for the elements of the distance-velocity-power matrix in a second dimension. This is done in such a way that the second discrete one-dimensional Fourier transform is carried out in a mathematically defined offset manner for each second element of the distance-velocity-power matrix.

Figure 9:
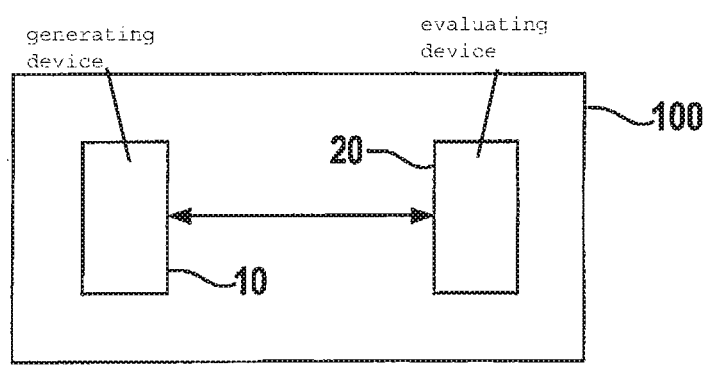
FIG. 9 shows a basic block diagram of one specific embodiment of the radar device according to the present invention.

In greatly simplified form, FIG. 9 shows a radar device 100, which includes a generating device 10 for generating elements of a distance-velocity-power matrix of a radar target 200. Radar device 100 also includes an evaluation device 20 for evaluating the elements of the distance-velocity-power matrix. Evaluation device 20 makes it possible to uniformly evaluate elements of the distance-velocity-power matrix in a first dimension, and evaluation device 20 makes it possible to evaluate elements of the distance-velocity-power matrix in a second dimension in a mathematically defined offset manner.

Radar device 100 may advantageously be developed in the form of conventional electronic hardware. A configuration of the hardware, such as a realization of the fast Fourier transform and other radar signal processing steps, is able to be carried out with the aid of software. As an alternative, the method may also be implemented completely in software. In an advantageous manner, the method according to the present invention may also be used for other applications, e.g., for an ultrasound device, provided a chirp sequence modulation is used.

One skilled in the art will modify the features of the present invention in an appropriate manner and combine them with one another without departing from the core of the present invention.

What is claimed is:

1. A method for operating a radar device, comprising:
receiving, by the radar device, reflected radiation;
ascertaining a matrix with time signals of the reflected radar radiation, each column of the matrix with time signals including values of received time signals of a chirp of a transmission sequence, a number of columns of the matrix with time signals corresponding to a number of chirps of the transmission sequence;
determining elements of a distance-velocity-power matrix of a radar target from the matrix with the time signals, the determining of the elements including:
carrying out a first discrete one-dimensional Fourier transform along each column of the matrix with the time signals to provide a resulting matrix, and
carrying out a second discrete one-dimensional Fourier transform along each row of the resulting matrix in such a way that the second discrete one-dimensional Fourier transform is carried out along each alternate row of the resulting matrix with a mathematically defined offset, the carrying out of the second discrete one-dimensional Fourier transform providing the distance-velocity-power matrix; and
detecting an object using the provided distance-velocity-power matrix.

2. The method as recited in claim 1, wherein the elements of the distance-velocity-power matrix are generated with the aid of a chirp sequence modulation.

3. The method as recited in claim 1, wherein each element of each alternate row of the resulting matrix is multiplied by the factor $e^{-j\pi n/N}$, wherein n is a column number of the resulting matrix, and N is a total number of the columns of the resulting matrix to provide the mathematically defined offset.

4. A non-transitory computer readable data carrier on which is stored a computer program having program code to operate an electronic radar device, the computer program, when executed by the electronic radar device, causing the electronic radar device to perform:
receiving, by the radar device, reflected radiation;
ascertaining a matrix with time signals of the reflected radar radiation, each column of the matrix with time signals including values of received time signals of a chirp of a transmission sequence, a number of columns of the matrix with time signals corresponding to a number of chirps of the transmission sequence;
determining elements of a distance-velocity-power matrix of a radar target from the matrix with the time signals the determining of the elements including:
carrying out a first discrete one-dimensional Fourier transform along each column of the matrix with the time signals to provide a resulting matrix, and
carrying out a second discrete one-dimensional Fourier transform along each row of the resulting matrix in such a way that the second discrete one-dimensional Fourier transform is carried out along each alternate row of the resulting matrix with a mathematically defined offset, the carrying out of the second discrete one-dimensional Fourier transform providing the distance-velocity-power matrix; and
detecting an object using the provided distance-velocity-power matrix.

5. A method for operating a radar device, comprising:
receiving, by the radar device, reflected radiation;
ascertaining a matrix with time signals of the reflected radar radiation, each column of the matrix with time signals including values of received time signals of a chirp of a transmission sequence, a number of columns of the matrix with time signals corresponding to a number of chirps of the transmission sequence;
determining elements of a distance-velocity-power matrix of a radar target from the matrix with the time signals, the determining of the elements including:
carrying out a first discrete one-dimensional Fourier transform along each row of the matrix with the time signals to provide a resulting matrix, and
carrying out a second discrete one-dimensional Fourier transform along each column of the resulting matrix in such a way that the second discrete one-dimensional Fourier transform is carried out along each alternate column of the resulting matrix with a mathematically defined offset, the carrying out of the second discrete one-dimensional Fourier transform providing the distance-velocity-power matrix; and
detecting an object using the provided distance-velocity-power matrix.

6. The method as recited in claim 5, wherein each element of each alternate column of the resulting matrix is multiplied by the factor $e^{-j\pi n/N}$, wherein n is a row number of the resulting matrix, and N is a total number of the rows of the resulting matrix to provide the mathematically defined offset.

* * * * *